United States Patent
Li et al.

(10) Patent No.: US 7,715,829 B2
(45) Date of Patent: May 11, 2010

(54) METHOD AND APPARATUS FOR SUPPORTING ENHANCED INTERNATIONAL DIALING IN CELLULAR SYSTEMS

(75) Inventors: Yan Li, Beijing (CN); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 11/301,835

(22) Filed: Dec. 12, 2005

(65) Prior Publication Data

US 2006/0177043 A1    Aug. 10, 2006

Related U.S. Application Data

(60) Provisional application No. 60/635,913, filed on Dec. 13, 2004.

(51) Int. Cl.
    H04M 3/42    (2006.01)
(52) U.S. Cl. .................................. 455/417; 370/270
(58) Field of Classification Search .............. 455/565, 455/564
    See application file for complete search history.

(56) References Cited

U.S. PATENT DOCUMENTS

| 5,216,709 | A  | 6/1993  | Wen et al.        |
|-----------|----|---------|-------------------|
| 5,305,372 | A  | 4/1994  | Tomiyori          |
| 5,978,678 | A  | 11/1999 | Houde et al.      |
| 6,134,319 | A  | 10/2000 | Burg et al.       |
| 6,259,914 | B1 | 7/2001  | Koster            |
| 6,345,184 | B1 | 2/2002  | Van Der Salm et al.|
| 6,490,449 | B1 | 12/2002 | Thibert et al.    |
| 6,526,267 | B1 | 2/2003  | Jokimies et al.   |
| 6,587,688 | B1 | 7/2003  | Chambers et al.   |
| 6,625,457 | B1 | 9/2003  | Raith             |

(Continued)

FOREIGN PATENT DOCUMENTS

DE    19623299    2/1998

(Continued)

OTHER PUBLICATIONS

"IFAST SID Ranges", http://www.ifast.org/SIDCountry.hmt. International Forum on ANSI-41 Standards Technology, Jun. 3, 2008.

(Continued)

Primary Examiner—Rafael Pérez-Gutiérrez
Assistant Examiner—Marcos Batista
(74) Attorney, Agent, or Firm—Kristine U. Ekwueme (57) ABSTRACT

A method and apparatus are provided that support enhanced international dialing in cellular systems using handset based code dialing. According to one aspect, the handset analyzes the dialed digits before sending the dialed number to the network. If the dialed digits begin with the country code of the area from which the call is placed, the country code will be removed and a national access code will be added in front of the digit strings. For international calls the dialed number may begin with a + indicator, followed by a country coded, an area code, and a customer number. The digit string is automatically translated into a new number based on the numbering plan of the area in which a call is being placed. The new number can then be sent to the network to set up the call.

20 Claims, 4 Drawing Sheets

U.S. PATENT DOCUMENTS

| | | |
|---|---|---|
| 6,704,566 B1 | 3/2004 | Besharat et al. |
| 6,751,481 B2 | 6/2004 | Chen et al. |
| 6,751,483 B1 | 6/2004 | Oh |
| 6,782,278 B2 | 8/2004 | Chen et al. |
| 6,871,056 B2 | 3/2005 | Cho |
| 7,336,949 B2 | 2/2008 | Nasielski |
| 2002/0107317 A1 | 8/2002 | Song |
| 2002/0160815 A1 | 10/2002 | Patel et al. |
| 2003/0100334 A1 | 5/2003 | Mazzara |
| 2004/0204118 A1 | 10/2004 | Tsai et al. |
| 2005/0094593 A1* | 5/2005 | Buckley .................... 370/328 |

FOREIGN PATENT DOCUMENTS

| | | |
|---|---|---|
| DE | 19638411 | 4/1998 |
| DE | 19711096 | 9/1998 |
| EP | 0526832 | 2/1993 |
| EP | 1441557 | 7/2004 |
| FR | 2788190 | 7/2000 |
| JP | 05-037457 | 12/1993 |
| JP | 06-163639 | 6/1996 |
| JP | 11-341141 | 12/1999 |
| JP | 2001-061000 | 3/2001 |
| JP | 2001-177627 | 6/2001 |
| JP | 2002-009925 | 1/2002 |
| JP | 2002-354098 | 12/2002 |
| JP | 2003-333165 | 11/2003 |
| WO | 01-63959 | 8/2001 |
| WO | 2004054310 | 6/2004 |

OTHER PUBLICATIONS

"International Numbering Resources: National Numbering Plans", http//www.itu.Int/ITU-T/Inr/nnp/index.hmtl, International Telecommunications Union, Sep. 28, 2009.

Hanyang Wang, "Plus code dialing investigation report," 3G-IOS V4.0.0 V&V Draft, Nov. 5, 1999.

International Search Report - PCT/US05/045163 - ISA/EPO - Apr. 3, 2006.

Written Opinion - PCT/US05/045163 - ISA/EPO - Apr. 3, 2006.

International Prelimianry Report on Patentability - PCT/US05/045163 - The International Bureau of WIPO - Geneva, Switzerland - Jun. 13, 2007.

3GPP2 N S0027 "Enhanced International Dialing, Calling Number Indentification and Callback, Calling Party Category Identification", Revision 0, Version 1.0.0, Apr. 2001.

"Mobile Network Code (MNC) for the international identification plan for mobile terminals and mobile users (According to ITU-T Rec. E.212 (Nov. 1998)", ITU, http://www.itu.int/itu-t/inr/forms/mnc.html.

"IFAST SID Ranges", http://www.ifast.org/SIDCountry.htm.

"International Numbering Resources", http //wwv.itu.int/ITU-T/inr/nnp/index.html.

Hanyang Wang, "Plus code dialing investigation report".

* cited by examiner

METHOD AND APPARATUS FOR SUPPORTING ENHANCED INTERNATIONAL DIALING IN CELLULAR SYSTEMS

CLAIM OF PRIORITY UNDER 35 U.S.C. §119

The present Application for Patent claims priority to U.S. Provisional Application No. 60/635,913, entitled "Method and Apparatus for Supporting Enhanced International Dialing in Cellular Systems", filed Dec. 13, 2004, assigned to the assignee hereof and hereby expressly incorporated by reference herein.

BACKGROUND

1. Field

The present invention relates generally to communications, and more specifically, to systems and techniques for supporting international dialing while roaming across multiple network platforms in a wireless communications system.

2. Background

Roaming refers to the ability to make and receive calls outside of a user's home network. More specifically, international roaming is the ability make and receive calls from a foreign country, using the user's own handset and the foreign country's wireless network. Typically, international roaming requires a user to dial an international access code to reach a telephone number outside of the country where the user is located. International access codes are specific to each country and, in some cases, to the carrier whose network supports the call. For example, a user in the United States must dial "011" on his handset in order to use the international roaming feature to place an international call. A user in France would dial "00," "40," or "70," or another international access code, depending on which carrier he chooses to utilize, in order to place an international call from France. Users who frequently travel must keep track of a variety of different international access codes in order to use their handsets to make phone calls in different countries. Because many countries have different international access codes, and because the international access codes within a single country may vary according to carrier, accurate knowledge of the codes may be a significant burden on travelers.

The "+ Code" Dialing Feature

A feature, sometimes referred to as the "+ code" dialing feature, enables international dialing in a cellular system. The Global System for Mobile Communications (GSM) standard for wireless networks supports a version of this international dialing feature in which users may dial a (+) key on their handset in lieu of dialing the international access code. Dialing the (+) key marks the call as an international call, instructing the local switching system to route the call to an international switch. The "+" indicator means the dialed digit string is an international number. For example, with + code dialing, a subscriber making an international call can dial "+Country-Code-AreaCode-Customer Number". According to this approach, the handset translates the "+" code into "international number type", the network recognizes the "international number type" and routes the call to international gateway, if the country code (CC) in the dialed number is different from the area of operation. By contrast, if the dialed digit string begins with the country code of the current serving system, then the network (MSC) should remove the CC from dialed number and set up the call as a local or national call.

To illustrate how some of these terms are commonly used, some examples will now be provided. When placing a call to a given phone number, the phone number dialed by a user can be in several different formats depending upon where the user is located and what network the user is calling from. For example, assume three callers located in different regions of the world would like to call someone in San Diego who has a customer/local number 658-2598. Further assume that the first caller is located in San Diego in a region with the same area code, the second caller is located in the United States but outside San Diego, and the third caller is located outside the United States, for instance, in China.

The first caller can simply dial the customer number or local number, 658-2598. If the first caller is still in San Diego, but calls from a region with a different area code the first caller might need to dial 858-658-2598, where the digits "858" are the area code. The second caller would have to dial 1-858-658-2598, where the digit '1' is the national access code, the digits "858" are the area code, and the digits "658-2598" are the customer number or local number. This is also known as a "long-distance" call. The third caller would have to dial 00-1-858-658-2598, where the digits "00" are international access code, the digit "1" is the country code for the United States (as opposed to the national access code in the preceding example), the digits "858" are the area code, and the digits "658-2598" are the customer number or local number. This call will be routed to an international gateway and then directed to the USA. Accordingly, with an international call, before the user dials the number, the user must know where they are making the call, and the international access code.

To help eliminate the need to know this information, in some networks, a feature known as enhanced international dialing can be used to simplify the dialing. According to this feature, all numbers can be expressed in the format "+ country code-area code-customer number), where "+" means the number is an international number type. The digits after + are the "country code". Thus, in the example above, the third caller can simply dial +1-858-658-2598, and does not need to know the international access.code.

Unfortunately, users whose handsets include the GSM-supported (+) key cannot utilize this function in areas that are not covered by a GSM network. If a mobile user dials a national call with international number type, some systems cannot correctly analyze the number to set up the call. For example, all code division multiple access (CDMA) systems do not support a + code dialing feature and do not recognize or support the mark accompanied by a call that has been placed with a (+) key, and therefore cannot route the call to an international switch. Instead, in order to route an international call, CDMA systems require the appropriate international access code to accompany the call. For example, a CDMA user typically must dial "IAC-CC-AC-CustomerNumber" to make international call, and the network routes the call to international gateway after recognizing the IAC. This requires that CDMA subscribers know the International Access Code (IAC) to make international calls and the National Access Code (NAC) to make national calls when roaming to other countries.

There has recently been an increasing demand for simplified access procedures when roaming internationally. To help alleviate these issues, patent application Ser. No. 10/315,673 entitled "International Dialing In Cellular Networks" filed Dec. 9, 2002, assigned to the assignee hereof and hereby expressly incorporated by reference herein, describes, among other things, an automated international dialing feature. This feature allows users to engage in international roaming, regardless of the network supporting the call, without knowing and entering the proper international access code.

Operators appreciate that Standard +code dialing will require roaming partners' to upgrade their networks to support this feature. These upgrades may not be deployed until some future time. In the interim, there is a need in the art for enhanced international dialing features that can help alleviate this problem. It would be desirable if such a feature could be implemented without the need to upgrade the serving networks.

SUMMARY

As noted above, if a mobile user dials a national call with international number type, some systems can not correctly analyze the number to set up the call. An aspect of the invention can automatically fix an unrecognizable number and thereby saving air interface resources. According to one embodiment, the number can be automatically changed from an international number type ("+CC-AC-#") to a new number which corresponds to a number recognizable by the serving MSC based on the geographic information and numbering plan of visited country.

According to one aspect, techniques are provided for dialing a call using an international number in a CDMA serving network. A call can be made by entering a dialed number comprising a digit string that corresponds to an international telephone number. The dialed number begins with a + indicator, followed by a country code, an area code and a customer number. The digit string is automatically translated into a new number based on a numbering plan of the area in which the call is being placed. The new number can then be sent to the CDMA serving network to set up the call. The new number may comprise a national number. The digit string may automatically be translated into the national number in a variety of ways. According to one embodiment, the digit string can be analyzed, before sending the dialed number to the CDMA serving network, to detect if the digit string includes a country code of an area to which the call is being placed. The call is an international call if the country code in the dialed number is different than the country code of the area which the call is being placed. The country code of an area is associated with a location information field that is used to match location information broadcast by the CDMA serving network. The country code can then be removed from the digit string if the country code in dialed digits matches with the country code of a serving network, and a national access code may be added (on demand) to the digit string to generate a new number.

According to another aspect, techniques are provided for placing a call in a serving wireless network that serves users in an area of operation. A called number is entered by the user which comprises a country code, an area code and a customer number. The handset then determines whether the called number further comprises an optional indicator and whether the country code corresponds to a country code of the serving network before sending the called number to the serving network. If the called number includes the optional indicator and the country code does not correspond to the country code of the serving network, the handset translates the optional indicator to an international access code for the serving network to generate a modified called number. The international access code of the serving network can then be inserted into the modified called number to generate a new called number.

BRIEF DESCRIPTION OF THE DRAWINGS

Aspects of the present invention are illustrated by way of example, and not by way of limitation, in the accompanying drawings, wherein.

TERMINOLOGY

A Location Information (LI) field is used to match location information broadcast by a serving network. Location Information can be identified, for example, by a MCC/MNC or SID/NID of the serving network, a range of MCC/MNC or SID/NID of the visited countries, latitude and longitude, or the combination of the above.

A Country Code (CC) of an area is associated with the LI. The wireless device compares the country code of the serving region and that of the dialed number to determine whether the call is an international call or national call. If it is national call, handset removes the CC from dial digit string, and then adds National Access Code (NAC) if a Special Prefix Code (SPC) does not match.

An International Access Code (IAC) of the area associated with LIs is used to make an international call in that area. The dialed number of an international call must begin with IAC.

A National Access Code (NAC) of the area associated with the LIs is used to make a national call in that area. The NAC should be put in front of the Area Code and customer number if the SPC does not match. In the area identified by LI, the numbers beginning with a Special Prefix Code (SPC) do not require NAC. Even if the calling party is outside numbering area where the call is placed, NAC must not be put in front of such numbers.

The Operator Name (OPN) can be specified in several languages. The wireless device can display the operator name on its screen to help the user recognize the serving network.

DETAILED DESCRIPTION

The detailed description set forth below in connection with the appended drawings is intended as a description of embodiments of the present invention and is not intended to represent the only embodiments in which the present invention may be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In the following detailed description, various techniques will be described in the context of a CDMA communications system. While these techniques may be well suited for use in this environment, those skilled in the art will readily appreciate that these techniques are likewise applicable to other wireless networks. Accordingly, any reference to a CDMA communications system is intended only to illustrate various inventive aspects of the present invention, with the understanding that these inventive aspects have a wide range of applications.

Figure 1:
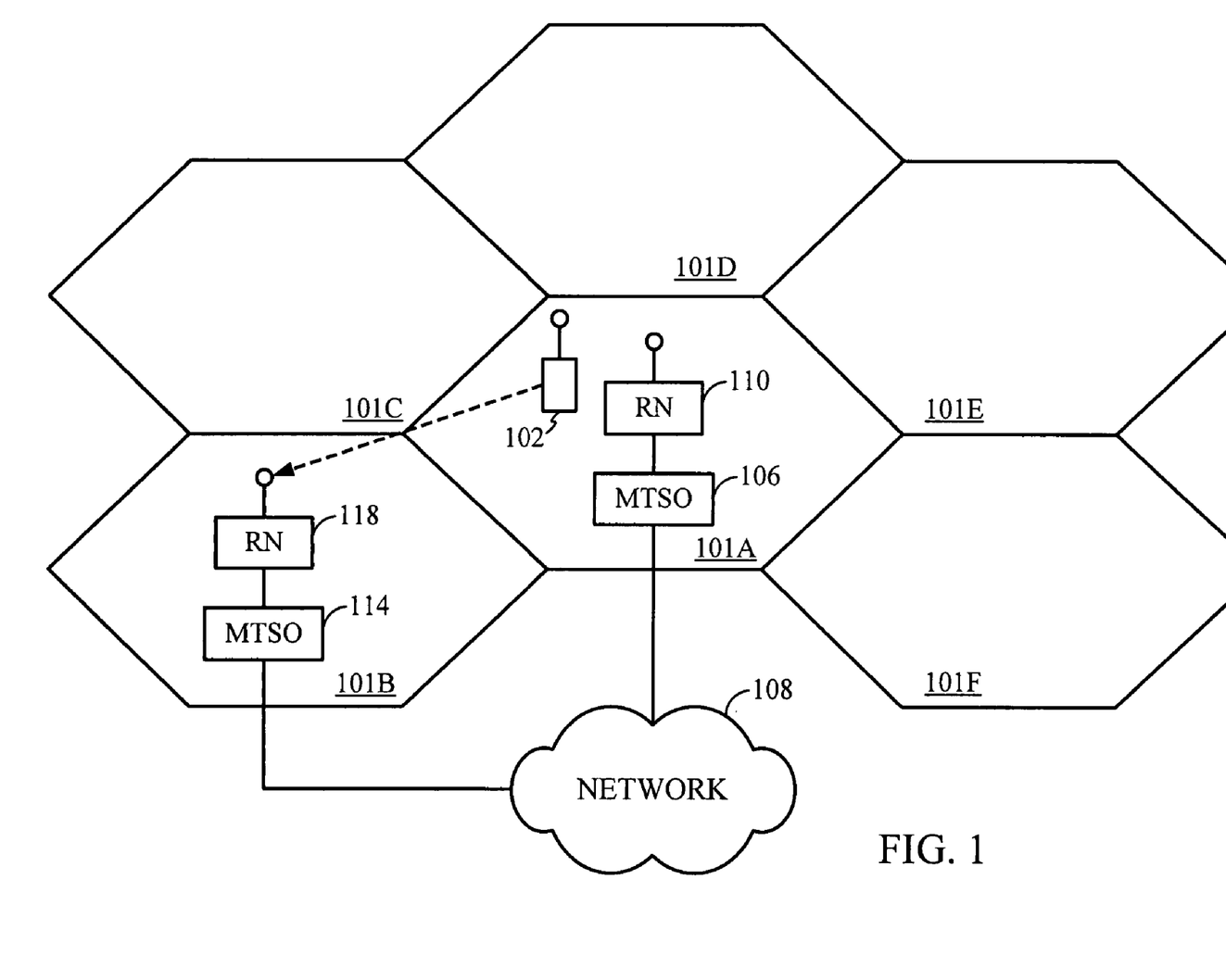
FIG. 1 is a conceptual block diagram of a CDMA communications system, according to an embodiment of the invention.

FIG. 1 is a conceptual block diagram of a CDMA communications system. The CDMA communications system is shown with a number of networks 101A-F. A subscriber station 102 is shown moving through different networks by a series of broken lines. The subscriber station 102 is shown initially in its home network 101A. The home network 101A may include one or more radio controllers for establishing and maintaining a wireless connection with all the subscriber stations in the home network 101A. A radio network may be defined as a collection of base stations and one or more base station controllers. For ease of explanation, only one radio network 110 is shown. The home network 101A may also include a mobile telephone switching office (MTSO) 106 which interfaces the radio network 110 to a wide area network (WAN) 108 such as a land-based public switched telephone network (PSTN) and/or a packet data based network.

As the subscriber station 102 moves through the home network 101A, it may communicate with other subscriber stations (not shown), or access the WAN 108, through the radio network 110. This may be accomplished by establishing a wireless link between the subscriber station 102 and the radio network 110 through a registration process. The registration process includes the transmission of a system identification code (SID) from the radio network 110 to the subscriber station 102 on an overhead channel. When the subscriber station receives the SID, it compares it to the SID programmed into the subscriber station 102. If the SIDs match, the subscriber station 102 knows that it is in communication with a radio network 110 from its home network 101A.

Once the subscriber station 102 receives the SID, it transmits a registration request to the radio network 110. The registration request may be used to report the location of the subscriber station 102 within the home network 101A to the MTSO 106. The MTSO 106 stores this information in a database. The database allows the MTSO to intelligently route calls to the subscriber station 102 without having to page the subscriber station 102 throughout the entire home network 101A. In response to the registration request, various system parameters may be sent back from the MTSO 106 to the subscriber station 102 via the radio network 110.

As the subscriber station 102 moves out of its home network 104, it will generally need to register with a new network. In the embodiment shown in FIG. 1, the subscriber station 102 is shown moving from its home network 101A into a foreign network 101B. The foreign network 101B will be referred to as a local network as long as the subscriber station 102 remains in that foreign network. During the registration process, the subscriber station 102 will receive a SID from a radio network 118 of foreign network 101B. However, unlike the registration process in the subscriber station's home network 101A, the SID from the radio network 118 will not match the SID programmed into the subscriber station 102. Because of the mismatch, the subscriber station 102 will recognize that it is outside its home network 101A and is, therefore, roaming. The subscriber station 102 then transmits a registration request to a MTSO 114 in the local network 101B through the radio network 118. The registration request includes the SID programmed into the subscriber station 102. The SID provides an indication to the MTSO 114 in the local network 101B that the subscriber station 102 is roaming. The MTSO 114 uses the SID to identify the home network 101A of the subscriber station 102. The MTSO 114 may then contact the MTSO 106 in the subscriber station's home network 101A for verification of the subscriber station 102. Once verified, various system parameters may be sent back from the MTSO 114 to the subscriber station 102 via the radio network 118 to complete the registration process.

Overview

Embodiments disclosed herein address the above stated needs by providing enhanced international dialing in a cellular system (e.g., CDMA) via a handset-based + code dialing solution. According to one aspect, the phone analyzes the dialed digits before sending the dialed number to the network. If the dialed digits begin with the country code of the area from which the call is placed, the country code will be removed and a national access code will be added in front of the digit strings. For example, in one embodiment, if the user dials the local or national number in an international number type, the phone automatically translates the dialed number into the national number type, and then sends the number to network to set up the call. Since the country code and international access code will be removed if the call is a national call, the digits transmitted over the air can be reduced and the air interface resources can be saved. As such, no change is needed to implement + code dialing. This handset-based solution does not require that roaming partners upgrade their networks. Rather, operators can implement this solution on their own handsets. This solution may operate more efficiently if the network broadcasts the correct MCC/MNC. If the network broadcasts the correct MCC/MNC, the lookup table may be more stable and reliable. There is no collision between the MCC/MNC assigned to each operator and the MCC/MNC assigned to each operator will not be changed. Without MCC/MNC broadcasting in the serving network, we will use other information broadcasting over over-head messages to identify the location, such as the SID/NID or latitude and longitude.

Handset Based + Code Dialing Solution

According to one embodiment, techniques are provided for dialing a call using an international number in a CDMA serving network. A call can be made by entering a dialed number comprising a digit string that corresponds to an international telephone number. The dialed number begins with a + indicator, followed by a country code, an area code and a customer number. The digit string is automatically translated into a new number based on a numbering plan of the area in which the call is being placed. The new number can then be sent to the CDMA serving network to set up the call. The new number may comprise a national number.

The digit string may automatically be translated into the national number in a variety of ways. According to one embodiment, the digit string can be analyzed, before sending the dialed number to the CDMA serving network, to detect if the digit string includes a country code of an area to which the call is being placed. The call is an international call if the country code in the dialed number is different than the country code of the area in which the call is being placed. The country code of an area is associated with a location information field that is used to match location information broadcasted by the CDMA serving network. The country code and + indicator can then be removed from the digit string if the country code in dialed digits matches with the country code of the serving network, and a national access code may be added (on demand) to the digit string to generate a new number. After removing the CC, the remaining numbers, beginning with a special prefix code, do not require the national access code in the area identified by the location information broadcasted by the serving network. The national access code is used to make a national call in the area associated with the location information. The national access code is located in front of an area code and customer number if a special prefix code does not match.

In another embodiment the digits may be analyzed before sending the dialed number to the CDMA serving network, to detect if the digits further comprise a country code of an area to which the call is being placed by comparing the country code of the CDMA serving network and a country code of the dialed number to determine whether the call is an international call or a national call. If the call is a national call, the national access code may be added to the digit string to generate a new number, by removing the country code from the dialed digit string, and then adding national access code to the digit string to generate a new number if the special prefix code does not match. This handset based + code dialing solution allows the user to simulate the standard + code dialing approach.

Figure 2:
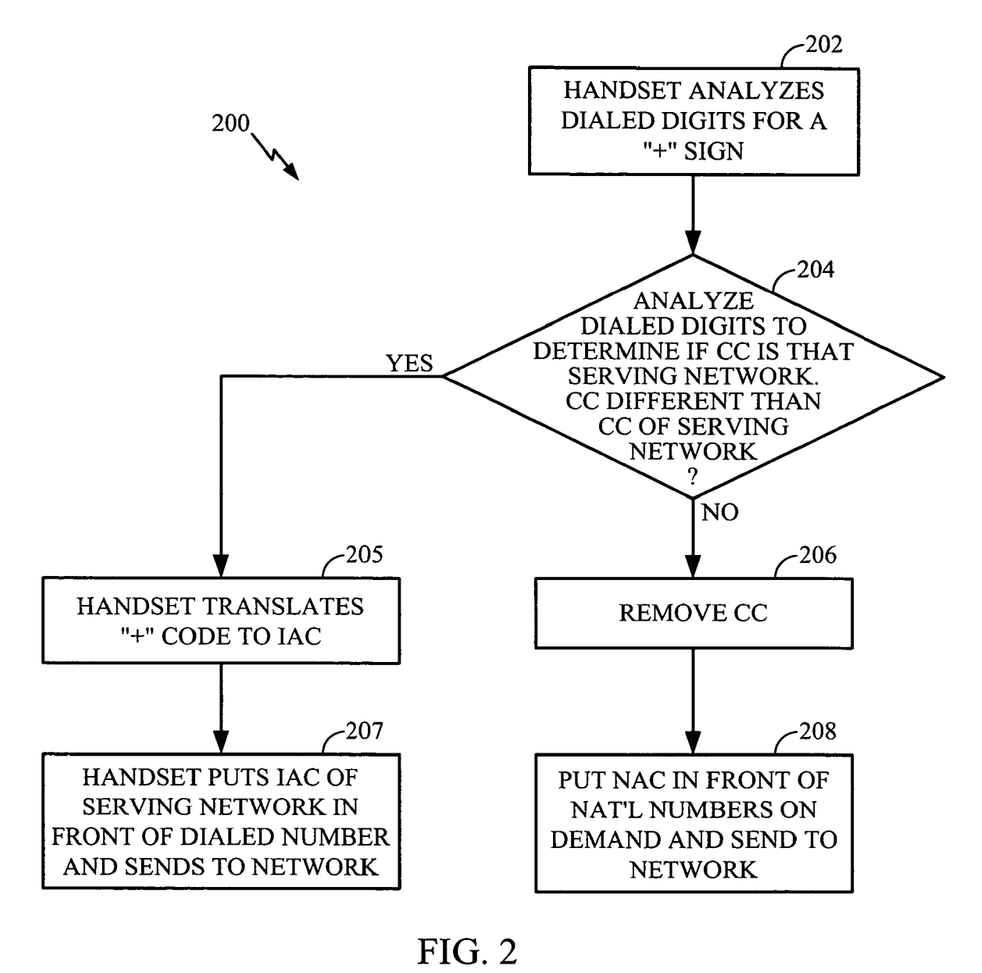
FIG. 2 is a simplified functional flow diagram illustrating features of a software application for implementing the + code dialing solution, according to an embodiment of the invention.

FIG. 2 is a simplified functional block diagram illustrating features of a software application for implementing the + code dialing solution. One example of the handset + code dialing solution will now be described with reference to FIG. 2. Before sending the dialed digits to network, at step 202, the handset analyzes the dialed digits to determine whether the dialed number begins with "+" code, and, at step 204, analyzes the dialed digits to determine whether the CC is that of the serving network. If the handset determines that the dialed number begins with "+" code and the CC is the same as the country code of the serving network, then at step 206, the handset will remove the CC, and at step 208, put the National Access Code (NAC) in front of the National numbers (Area-Code-Customer Number on demand). The handset then sends the number to the network to setup the call. By contrast, if the handset determines that the dialed number begins with "+" code, but that the CC is different from the CC of the serving network, then at step 205, the handset can translate the "+" code to IAC and at step 207 put the IAC of the serving network in front of the dialed number. The handset can then send the number to be called (new called number) to the network to setup the call.

In some countries such as China, there may be some nationally assigned phone numbers, which can be reached without NAC even if it is a long distance call. If the NAC is put before such subscriber number, the call cannot be put through. In China, for example, the numbers of all CDMA and GSM mobile phones begin with "13". As such, to call a mobile subscriber, the digits "13" must be dialed before the phone number. If NAC ('0' in China) is put in front of the number, the call cannot be put through. The handset needs to recognize such numbers and must not add the NAC after removing the CC.

Look-up Table

In order to analyze the dialed number and make proper translation, a look-up table can be stored in the phone or removable storage device attached with the phone, like R-UIM card. Each serving network or visited country has at least one entry in the table to provide the Location Information (LI), the Country Code (CC), the International Access Code (IAC), the National Access Code (NAC), the Special Prefix Code (SPC), and the Operator Name (OPN).

The granularity of the Location Information can be operator-wise or country-wise. If one country has one IAC for all operators, one entry may be enough for the country. Otherwise, one entry may be specified for each operator. This could be done, for example, if different operators in the country have different IACs or dialing plans, or if it is desired to share the same look-up table for operator name display.

The look-up table can be stored in the handset, and controlled by home operator. If there are more than one international or national service providers in certain country, the operator can select its preferred service provider and specify its preferred service provider in their IAC and NAC in look-up table. The restriction policy in the roaming country has no impact on home operator's selection of its preferred service providers.

One method of defining the look-up table is to list the LI and rule of translation in each record of the table. In addition, this information can be split into multiple (e.g., two or more) tables. For example, a Translation Rule Table can specify the type of translation rule, while another table can specify the LI, Operator Name, and an index of the translation record in Translation Rule Table. The Translation Rule Table can specify the translation rule of the location associated with this LI. Splitting the LI and translation rule into two tables can greatly simplify the table since operators in many countries have adopted the ITU-T recommendation that "00" be used for IAC and "0" be used for NAC, whereas operators in North America are using the North America Numbering Plan.

Manual Input Alternative

Sometimes the handset may not be able to obtain the correct IAC and NAC. For example, the IAC/NAC in the visited country may have been changed, or the table might be out-of-date, or the location information (MCC/MNC and/or SID/NID) is not broadcast correctly.

If the IAC and NAC can not be obtained from the look-up table, the user can manually input the substitute parameters via keypad. According to this manual input embodiment, the parameters obtained from the look-up table will be overwritten. For networks in which CDMA operators have implemented "Welcome SMS," when the phone registers in roaming partner's network, several "Welcome SMS" can be sent to the user that include the IAC and NAC of the visited country. When user receives the SMS, the user can manually input the IAC/NAC into the phone. The user can then simply dial the number with + code each time the user makes a call, and the phone can translate the dialed number to desired number. Using this manual input embodiment, a user can select to use a favorite service provider based on variables, such as, the calling price and service quality.

Procedure of Handset Based + Code Dialing

According to another embodiment, techniques are provided for placing a call in a serving wireless network that serves users in an area of operation. A called number is entered by the user which comprises a country code, an area code and a customer number. The handset then determines whether the called number further comprises an optional indicator and whether the country code corresponds to a country code of the serving network before sending the called number to the serving network. The optional indicator may be, for example, a "+" code/digit, an "*" code/digit, etc. If the called number includes the optional indicator and the country code does not correspond to the country code of the serving network, the handset translates the optional indicator to an international access code for the serving network to generate a modified called number. The international access code of the serving network can then be inserted into the modified called number to generate a new called number.

If the called number has a "+" indicator and is not the local number of the visited country, then the call is an international call. In this case, the international access code of the serving network can be inserted at the beginning of the modified called number to generate a new called number or translated digit string. The new called number can then be sent to the serving network to setup the call.

If the called number includes the optional + indicator and the country code corresponds to the country code of the serving network (e.g., called number is the local number of the visited country), the country code may be removed from the called number to produce a reduced called number comprising the area code and the customer number, and if the reduced called number does not include a SPC, a national access code of the reduced called number can be inserted into the reduced called number to generate a new called number. The new called number can then be sent to the serving network to setup the call.

Figure 3:
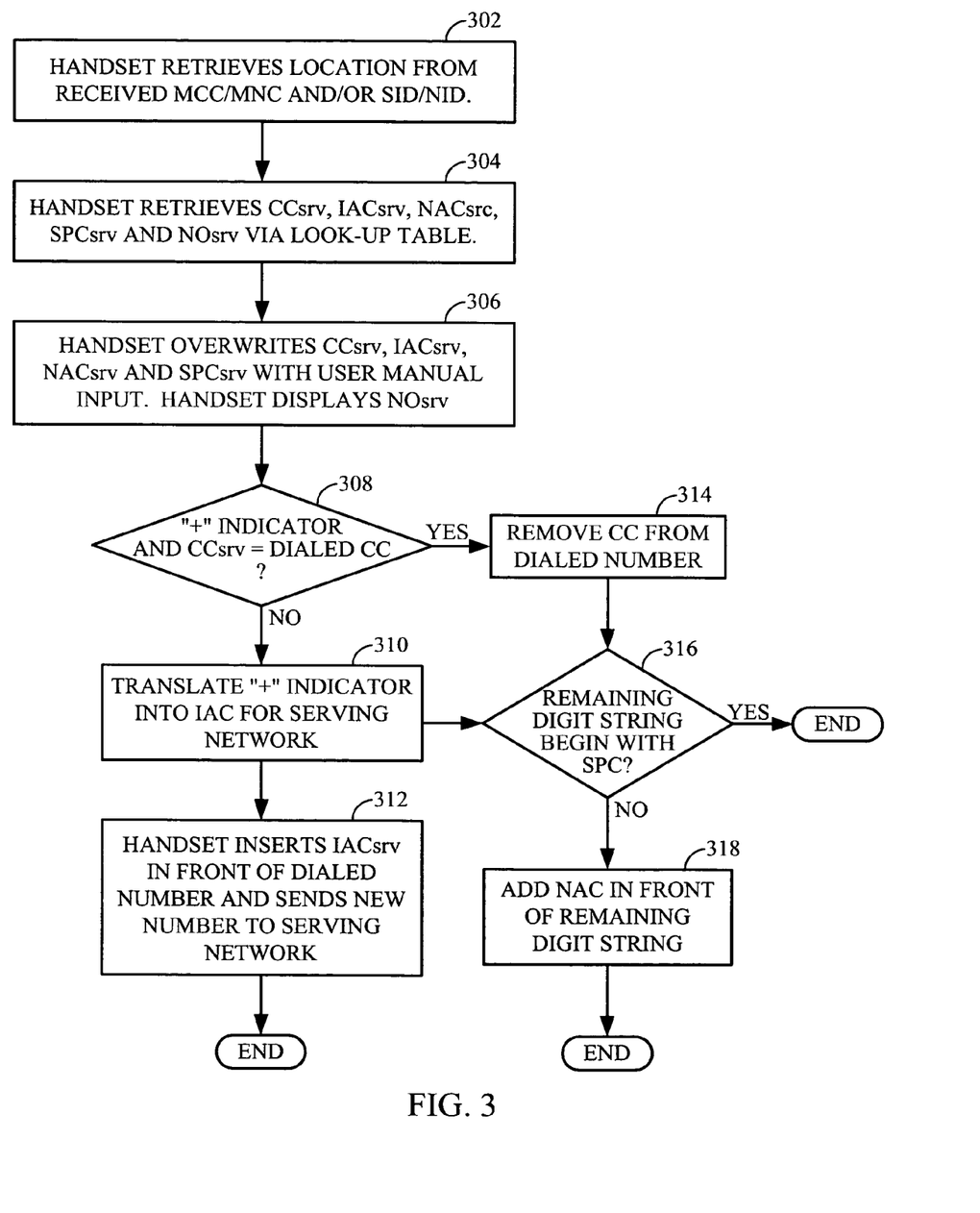
FIG. 3 is another simplified functional flow diagram illustrating features of a software application for implementing the + code dialing solution, according to an embodiment of the invention.

FIG. 3 is another simplified functional block diagram illustrating features of a software application for implementing the + code dialing solution. At step 302, the handset retrieves the location from the received MCC/MNC and/or SID/NID. In step 304, the handset then retrieves the CCsrv, IACsrv, NACsrc, SPCsrv and NOsrv of the serving network via looking up the table stored in phone. At step 306, the handset overwrites the CCsrv, IACsrv, NACsrv and SPCsrv with the user manually input alternative based on user's selection. The handset displays the Name of Operator (NOsrv) on the phone screen.

The user dials the called number via keypad, or selects the number stored in phonebook.

At step 308, it is determined whether the called number has "+" indicator and is the local number of the visited country, i.e. CCsrv=dialed CC. If it is determined that the called number has a "+" indicator and is not the local number of the visited country, the handset knows that the call is an international call. In this case, at step 310, the handset translates the + indicator into an international access code for the serving network to generate a modified called number. At step 312, the handset inserts the IACsrv in the front of the dialed number. The handset then permits further call processing and sends the translated digit string or "new" called number to the serving network.

By contrast, if it is determined at step 308 that the called number has "+" indicator and is the local number of the visited country, i.e. CCsrv=dialed CC, then at step 314 the CC is removed from the dialed number. If the remaining digit string begins with SPC as shown in step 316, then the process is done (not shown in FIG. 3). However, if the remaining digit string does not begin with the SPC, then at step 314 a national access code is added in the front of the remaining digit string in step 318. At that point the process ends.

Short Message Origination

ANSI-41 includes two options for SMS origination. According to the first option, the visiting MSC analyzes the destination number and forwards the SMS message to the destination home SMSC. The destination number preferably follows the numbering plan of the visited network. According to the second option, the visiting MSC analyzes the origination number and forwards the SMS message to the origination or home, SMSC. The calling party SMSC then analyzes the destination number and forwards the SMS to the destination home SMSC. Here, the destination number preferably follows the numbering plan of home network. The phone can retrieve the home network information based on the MCC/MNC of the IMSI of the subscriber and get the CC and IAC/NAC accordingly.

Call Forwarding

If the call forwarding number includes a + indicator, the + code should be translated using the rules of home network instead of the serving network. The phone can retrieve the home network information based on the MCC/MNC of the IMSI of the subscriber and get the CC and IAC/NAC accordingly.

Implementation

In those networks that support Asterisk Code Dialing, the asterisk code can be stored in the look-up table.

In one embodiment, the look-up table can be stored in a R-UIM card. In another embodiment, a BREW® application or other software application, in the phone can be used to update the look-up table over the air on demand. If the home network doesn't support BREW® or other software applications, a cable based update approach can be used where the user can go to a service center and have the look-up table updated.

Exemplary Look-up Table

Table 1 is one example of a lookup table that lists information for China Unicom and its roaming partners' network. In this example, each entry includes the location information, translation rules and operator names of a serving network or a country. Some operators or regions have identical translation rules. In Table 1, the NULL SPC field means that there is no special number in that region or network. Any call to all national customer numbers in that country should add NAC. The table is not complete due to lack of information. To complete the table, further details regarding the dialing plan of each country is required.

TABLE 1

Exemplary Look-up Table

| MCC | MNC | SID Records | | | | CC | SPC | NPT | IAC | NAC | Country | OPN |
| --- | --- | --- | --- | --- | --- | --- | --- | --- | --- | --- | --- | --- |
| | | C.I. | R.I. | Min | Max | | | | | | | |
| 311 | 28 | 1 | 1 | 1 | 2175 | 1 | — | (NANP) | — | — | USA | Verizon |
| | | 0 | 1 | 2304 | 7679 | | | | | | | |
| 724 | 06 | 0 | 0 | 23 | — | 55 | — | (Specific) | 0021 | 0 | Brazil | Vivo |
| | | 1 | 0 | 65 | — | | | | | | | |
| | | 1 | 0 | 69 | — | | | | | | | |
| | | 0 | 0 | 71 | — | | | | | | | |
| | | 1 | 0 | 330 | — | | | | | | | |
| | | … | … | … | — | | | | | | | |

TABLE 1-continued

Exemplary Look-up Table

| MCC | MNC | SID Records | | | | CC | SPC | NPT | IAC | NAC | Country | OPN |
| | | C.I. | R.I. | Min | Max | | | | | | | |
| --- | --- | --- | --- | --- | --- | --- | --- | --- | --- | --- | --- | --- |
| 450 | 03 | 0 | 1 | 2220 | 2238 | 82 | — | (Specific) | 00700 | 0 | Korea | SKT |
| 530 | 02 | 0 | 0 | 8583 | — | 64 | — | (ITU) | — | — | New Zealand | TNZ |
| 454 | 05 | 0 | 1 | 10640 | 10655 | 852 | — | (Specific) | 0080 | — | Hong Kong 中国香港 | Hutchison HK 和记电信 |
| 440 | — | 0 | 1 | 12288 | 13311 | 81 | — | (Specific) | 001010 | 0 | Japan | KDDI |
| 460 | 03 | 0 | 1 | 13568 | 14335 | 86 | 13 | (ITU) | — | — | China 中国 | Unicom 联通 |
| 404 | 00 | 0 | 0 | 14655 | — | 91 | 98 | (ITU) | — | — | India | Reliance |
| 302 | — | 0 | 0 | 16384 | — | 1 | — | (NANP) | — | — | Canada | |
| | | 0 | 0 | 16422 | — | | | | | | | |
| | | 0 | 0 | 17500 | — | | | | | | | |
| 302 | 65 | 0 | 0 | 16420 | — | 1 | — | (NANP) | — | — | Canada | Bell Mobility |

Examples of + Code Translation

To illustrate how translation of the called number would work in the context of exemplary Look-up Table shown above, a few examples are outlined below.

For a call to a China Fixed-line phone in Unicom network to number +86 10 82856030 with a Serving Network having MCC=460, MNC=03, SID=13824=>CCsrv=86, IACsrv=00, NACsrv=0, SPCsrv=13, there is a country code match, but no SPC match. In this case, the CC will be removed and NAC will be added. As such, the number will be translated to "0 10 82856030".

For a call to a China mobile phone in Unicom network to number +86 13301338000 with a Serving Network: MCC=460, MNC=03, SID=13824=>CCsrv=86, IACsrv=00, NACsrv=0, SPCsrv=13, the country code and SPC matches. In this case, the CC will be removed and NAC will not be added. As such, the number will be translated to "13301338000".

For a call to a China Fixed-line phone in Brazil to a called Number +86 13301338000 with Serving Network: MCC=724, MNC=xx, SID=31872=> CCsrv=55, IACsrv=0021, NACsrv=0, SPCsrv=NONE, the country code doesn't match. As such, the IAC will be added, and the number will be translated to "0014 86 13301338000".

Figure 4:
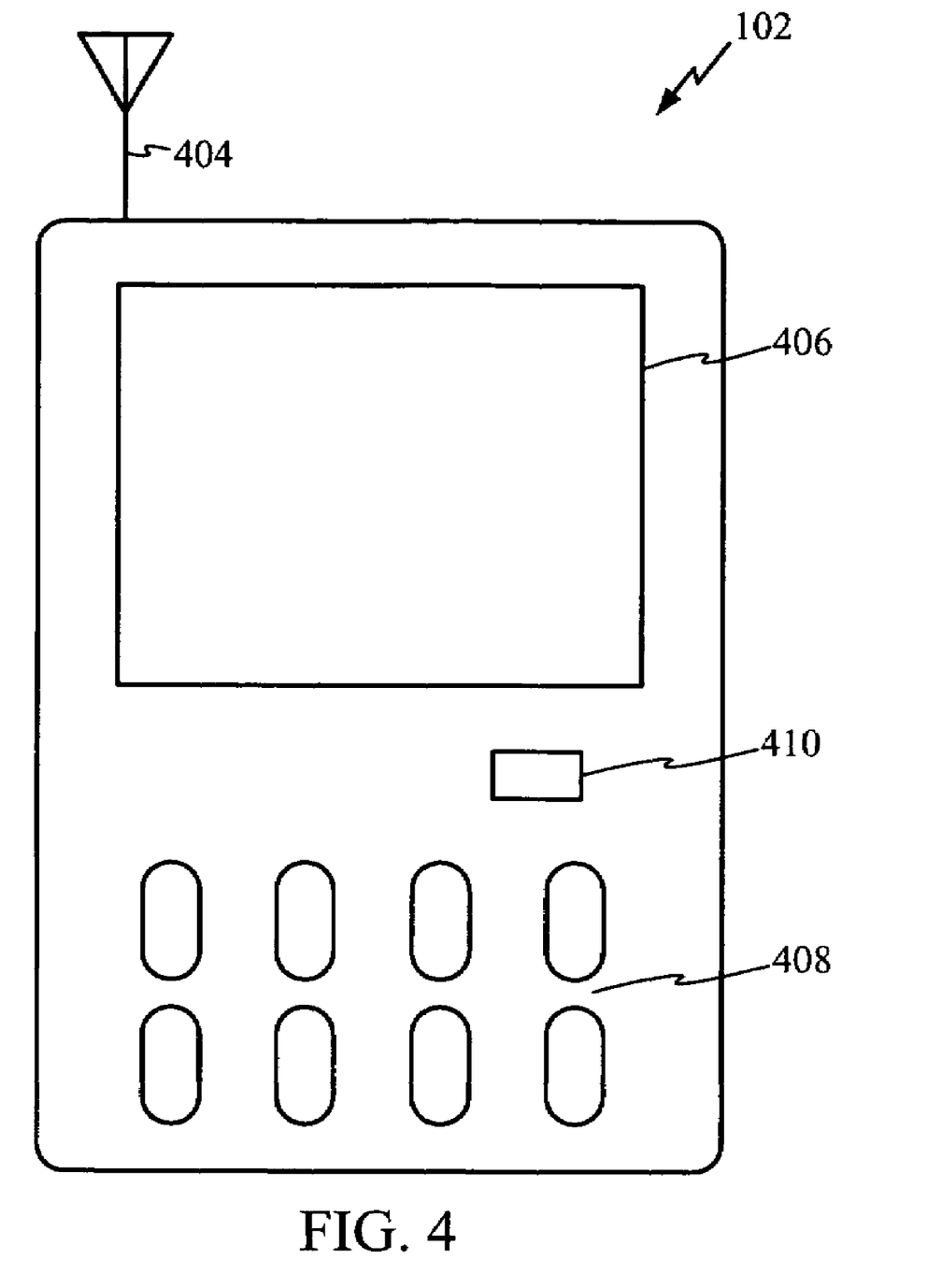
FIG. 4 is an embodiment of a subscriber station that may be configured to implement the + code dialing solutions, according to an embodiment of the invention.

FIG. 4 is an embodiment of a subscriber station that may be configured to implement the systems and methods described above. The subscriber station 102 may be a handset, or other similar device, and may include, among other features, an antenna 404 for performing information retrieval and other functions during registration, a display screen 406 for displaying information to a user, a key pad 408 including number keys for enabling a user to dial a telephone number, and a key 410 for activating the handset + code dialing methods described above. By activating the key 410, the user signals that he or she is making a call using an international telephone number but will not be entering an international access code. This signals the subscriber station 102 to employ the handset + code dialing techniques described above. The resultant phone number may then be properly identified and routed within the CDMA communications system. Note that in an alternate embodiment, the key 410 may be part of the keypad 408, such as an existing key.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for placing an international call in a CDMA serving network using a wireless telephone, comprising: analyzing a string of digits by a processor, to detect if the string of digits includes a special character, a country code, and a special prefix code; removing the special character and the country code from the string of digits if the country code matches a serving network country code and adding a national access code to the string of digits if the special prefix code is not found within the string of digits to generate an altered string of digits; otherwise removing the special character and inserting an international access code associated with the serving network if the country code from the string of digits does not match the serving network country code to generate an altered sting of digits; and transmitting the altered string of digits to a base station.

2. The method of claim 1, further comprising:
receiving the serving network country code from the serving network at a time prior to placing the international call.

3. The method of claim 1, wherein the special character comprises a '+' or '*' character.

4. The method of claim 2, wherein the special prefix code comprises a two digit number.

5. The method of claim 1, wherein the special character comprises a '+' or '*' character and the special prefix code comprises a two digit number.

6. An apparatus for use in a wireless device for placing an international call in a CDMA serving network, comprising:
means for analyzing a digit string to detect if the digit string includes a special character, a country code, and a special prefix code;
means for analyzing a string of digits by a processor, to detect if the string of digits includes a special character, a country code, and a special prefix code;
means for removing the special character and the country code from the string of digits if the country code matches a serving network country code and adding a national access code to the string of digits if the special prefix code is not found within the string of digits to generate an altered string of digits; otherwise
means for removing the special character and inserting an international access code associated with the serving network if the country code from the string of digits does not match the serving network country code to generate an altered string of digits; and
means for transmitting the altered string of digits to a base station.

7. The processor of claim 6, further comprising:
means for receiving the serving network country code from the serving network at a time prior to placing the international call.

8. The apparatus of claim 6, wherein the special character comprises a '+' or '*' character.

9. The apparatus of claim 6, wherein the special prefix code comprises a two digit number.

10. The apparatus of claim 6, wherein the special character comprises a '+' or '*' character and the special prefix code comprises a two digit number.

11. A wireless device for placing an international call within a CDMA serving network comprising:
a processor for analyzing a string of digits to detect if the string of digits includes a special character, a country code, and a special prefix code, for removing the special character and the country code from the string of digits if the country code matches a serving network country code and adding a national access code to the string of digits if the special prefix code is not found within the string of digits to generate an altered string of digits; otherwise, removing the special character and inserting an international access code associated with the serving network if the country code from the string of digits does not match the serving network country code to generate an altered string of digits; and
a transmitter for transmitting the altered string of digits to the serving network.

12. The wireless device of claim 11, further comprising:
a receiver for receiving the serving network country code from the serving network at a time prior to placing the international call.

13. The wireless device of claim 11, wherein the special character comprises a '+' or '*' character.

14. The wireless device of claim 11, wherein the special prefix code comprises a two digit number.

15. The wireless device of claim 11, wherein the special character comprises a '+' or '*' character and the special prefix code comprises a two digit number.

16. A processor for use in a wireless device for placing an international call in a CDMA serving network, comprising:
a first module for analyzing a digit string to detect if the digit string includes a special character, a country code, and a special prefix code;
a second module for analyzing a string of digits by a processor, to detect if the string of digits includes a special character, a country code, and a special prefix code;
a third module for removing the special character and the country code from the string of digits if the country code matches a serving network country code and adding a national access code to the string of digits if the special prefix code is not found within the string of digits to generate an altered string of digits; otherwise
a fourth module for removing the special character and inserting an international access code associated with the serving network if the country code from the string of digits does not match the serving network country code to generate an altered string of digits; and
a fifth module for transmitting the altered string of digits to a base station.

17. The processor of claim 16, further comprising:
a fifth module for receiving the serving network country code from the serving network at a time prior to placing the international call.

18. The processor of claim 16, wherein the special character comprises a '+' or '*' character.

19. The processor of claim 16, wherein the special prefix code comprises a two digit number.

20. The processor of claim 16, wherein the special character comprises a '+' or '*' character and the special prefix code comprises a two digit number.

* * * * *

UNITED STATES PATENT AND TRADEMARK OFFICE
CERTIFICATE OF CORRECTION

PATENT NO.        : 7,715,829 B2                                        Page 1 of 1
APPLICATION NO.   : 11/301835
DATED             : May 11, 2010
INVENTOR(S)       : Li et al.

It is certified that error appears in the above-identified patent and that said Letters Patent is hereby corrected as shown below:

Column 13, line 24, claim 1: "sting" to read as --string--

Signed and Sealed this
Seventeenth Day of May, 2011

David J. Kappos
*Director of the United States Patent and Trademark Office*